(12) United States Patent
Kushida et al.

(10) Patent No.: US 7,187,270 B2
(45) Date of Patent: Mar. 6, 2007

(54) VEHICLE DISPLAY DEVICE AND LIGHT GUIDE PLATE THEREOF

(75) Inventors: Kazumitsu Kushida, Wako (JP); Mutsumi Katayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 71 days.

(21) Appl. No.: 10/716,151

(22) Filed: Nov. 17, 2003

(65) Prior Publication Data

US 2004/0135679 A1   Jul. 15, 2004

(30) Foreign Application Priority Data

Dec. 4, 2002   (JP) ............................. 2002-352838

(51) Int. Cl.
  *B60Q 1/00*   (2006.01)
(52) U.S. Cl. ...................... 340/438; 340/432; 340/901; 345/7; 359/629; 359/630; 359/636; 362/511
(58) Field of Classification Search ................ 340/438, 340/901, 908, 432; 345/7, 8; 359/630, 631, 359/632, 633, 636, 629; 701/201, 208, 210; 116/28 R; 362/511
See application file for complete search history.

(56) References Cited

U.S. PATENT DOCUMENTS

| 4,990,899 | A | | 2/1991 | Gerlitz et al. |
| 5,261,349 | A | * | 11/1993 | Iino et al. .................... 116/289 |
| 5,341,230 | A | | 8/1994 | Smith |
| 5,453,877 | A | | 9/1995 | Gerbe et al. |
| 5,469,184 | A | | 11/1995 | Mount |
| 5,760,931 | A | * | 6/1998 | Saburi et al. .................. 359/13 |
| 5,864,432 | A | | 1/1999 | Deter |
| 6,200,010 | B1 | * | 3/2001 | Anders ........................ 362/511 |
| 6,469,755 | B1 | * | 10/2002 | Adachi et al. ................ 349/62 |
| 6,580,562 | B2 | * | 6/2003 | Aoki et al. .................. 359/630 |
| 2002/0126391 | A1 | | 9/2002 | Kushida et al. |

FOREIGN PATENT DOCUMENTS

| JP | 10241431 | 9/1998 |
| JP | 2001-278153 | 10/2001 |
| JP | 2002 040260 | 2/2002 |

\* cited by examiner

*Primary Examiner*—Davetta W. Goins
(74) *Attorney, Agent, or Firm*—Hamre, Schumann, Mueller & Larson, PC

(57) ABSTRACT

Disclosed are a vehicle display device providing excellent visibility and does not obstruct a sight ahead of a driver, regardless of a frame, a seating position and the like of the driver. The device comprises a transparent light guide plate having first and second major surfaces, and an other side that can be seen therethrough from the first major surface. The light guide plate stands in such a position that the first major surface thereof faces a driver in a sight ahead of the driver. At the same time, the light guide plate is tilted rearward while an entrance end plane thereof comes at the bottom and an emission end plane thereof comes at the top. Luminous elements are placed on the entrance end plane of the light guide plate. In the light guide plate, a distance from the entrance end plane to the emission end plane is sufficiently long relative to a plate thickness. The emission end plane of the light guide plate may include a plurality of planes having different inclination angles or may be frosted. On the first major surface of the light guide plate, a groove may be formed in a direction perpendicular to a light guide direction.

12 Claims, 6 Drawing Sheets

VEHICLE DISPLAY DEVICE AND LIGHT GUIDE PLATE THEREOF

FIELD OF THE INVENTION

The present invention relates to a vehicle display device and a light guide plate thereof, and more particularly to a vehicle display device and a light guide plate thereof which are preferable for displaying information and the like that alert a driver.

BACKGROUND OF THE INVENTION

Advanced Safety Vehicle (ASV) technologies have been developed in addition to technologies that have been used so far and are mainly intended for occupant protection after a collision. The ASV technologies are mainly intended for prevention and avoidance of accidents by utilizing information/communication and electronic technologies. The ASV technologies focus on driver supports for safe driving, and these supports include recognition support, judgment support, operation support and the like, if the ASV technologies are put into practical use, it will become feasible to detect a forward obstacle using a radar technology or the like and to notify and alert a driver to the obstacle once the obstacle is detected.

A warning light for this type of highly emergent notification is preferably located at the center of a view (central view) of a driver when the driver casts his eyes to the front. Thus, the driver can recognize the notification even when the driver looks away from a meter panel at a seating position. However, the warning light provided at the center of the view may obstruct the driver's sight while driving.

A Head-Up Display (HUD) device (hereinafter, referred to as HUD) has been proposed as a technology which resolves such a technological problem and ensures both visibility and a view. The HUD enables displayed information to be visually recognized as a virtual image in the sight ahead of the driver. For the HUD of a motorcycle, a technology is used in which optical information irradiated from a luminous element such as LED is reflected off a windshield, and the reflected light enters eyeballs of the driver. This technology is disclosed in, for example, Japanese Patent Laid-Open Publication NO. 2001-278153.

In the above-mentioned known HUD, the light irradiated from a light source is required to enter into the eyeballs of the driver after being reflected off a windshield. However, the position, angle, size, material and the like of the windshield is limited by the aerodynamic characteristics, design, strength and the like of the motorcycle. Therefore, an optical path has to be adjusted only by mounting positions and direction angles of the luminous elements. However, in order to enter the light reflected off the windshield into the eyeballs of the driver, the luminous elements have to be placed at extremely limited positions between the meter panel and the windshield in a general motorcycle structure. Under such a limitation, there is a low degree of flexibility in the position and the direction angle of the luminous elements. Ultimately, the limitation may hamper an expanded application of the HUD to various vehicle models.

Furthermore, since positions of the driver's eyeballs vary in accordance with a frame, a seating posture, a seating position and the like of the driver, it is required to scatter the reflected light over a relatively wide area. However, when the windshield is used as a reflection medium, it is difficult to scatter the light over the wide area using the surface thereof, thus causing uneven levels of visibility depending on the driver.

An object of the present invention is to provide a vehicle display device which resolves the foregoing problems of the known technologies, provides excellent visibility and does not obstruct a sight ahead of a driver regardless of a frame and a seating position and the like of the driver, and a light guide plate thereof.

SUMMARY OF THE INVENTION

The present invention is a vehicle display device which displays vehicle information using light emission comprising the following measures taken in order to achieve the above-mentioned object.

The vehicle display device includes a transparent light guide plate, a supporting mechanism and at least one luminous element. The light guide plate has a first major surface and a second major surface, through which an other side can be seen from the first major surface. The supporting means stands the light guide plate in such a position that the first major surface thereof faces a driver in front of a sight of the driver. In this position, the light guide plate also tilts rearward while a light entrance end plane thereof comes at the bottom and a light emission end plane thereof comes at the top. At least one luminous element is placed on the entrance end plane of the light guide plate.

The emission end plane of the light guide plate may include a plurality of planes having different inclination angles with reference to front and rear directions. The emission end plane of the light guide plate may be frosted.

A groove may be formed in the first major surface of the light guide plate in a width direction of the light guide plate to be perpendicular to a light guide direction.

A distance from the entrance end plane to the emission end plane of the light guide plate is sufficiently long with reference to a distance between the first and second major surfaces thereof wherein a direct light beam and a light beam reflected a plurality of times within the light guide plate in a plate width direction are emitted from the emission end plate.

The vehicle display device may further include a display panel which represents an image by utilizing differences in light transmittance, and a projection light source which projects the image on the display panel onto the first major surface of the light guide plate.

Moreover, the present invention is related to a light guide plate of a vehicle display device, which guides light to an emission end plane and emits the light, the light being incident from an entrance end plane. A groove may be formed in the first major surface of the light guide plate in a width direction of the light guide plate to be perpendicular to a light guide direction. A distance from the entrance end plane to the emission end plane of the light guide plate is sufficiently long with reference to a distance between the first and second major surfaces thereof wherein a direct light beam and a light beam reflected a plurality of times within the light guide plate in a plate width direction are emitted from the emission end plate. The emission end plane of the light guide plate may include a plurality of planes having different inclination angles. The emission end plane of the light guide plate may be frosted.

Light irradiated from the luminous element is guided to the emission end plane and emitted by the light guide plate. Therefore, the light irradiated from the luminous element can be irradiated to positions of the driver's eyeballs by adjusting the mounting angle of the light guide plate and the inclination angle of the emission end plane. Further, the light guide plate is a transparent body so that an other side can be seen therethrough from the first major surface thereof. Therefore, the sight ahead of the driver is not obstructed by the light guide plate.

A plurality of emission end planes having inclination angles with reference to front and rear directions provides an emission end plane where sunlight is not reflected can be always ensured. Therefore, it is possible to prevent poor visibility where transmitted light from the light source cannot be recognized due to reflected sunlight. Further, emitting directions are different for each emission end plane. As a result, an irradiation area of the light can be expanded, and thereby the light can be irradiated to the driver's eyeball positions regardless of the frame and posture of the driver.

The emission end plane of the light guide plate may be frosted thereby scattering the emitted light, and thus the irradiation area of the light can be expanded. Therefore, the light can be irradiated to the driver's eyeball positions regardless of the frame and posture of the driver.

A groove can be formed in the first major surface of the light guide plate in a width direction of the light guide plate to be perpendicular to a light guide direction so that a part of the light transmitted from the light guide plate is emitted outside from the groove and enters the eyeballs of the driver. Therefore, a state of the luminous element can be identified based on presence of the emitted light from the groove even in the case where the emitted light from the emission end plane is difficult to be recognized due to the reflected sunlight.

A distance from the entrance end plane to the emission end plane of the light guide plate is sufficiently long with reference to a distance between the first and second major surfaces thereof to that among the light beams incident from the luminous element, not only direct light beams but also light beams which are reflected plurality of times within the light guide plate in a plate-width direction can be emitted from the emission end plane. As a result, the irradiation area of the emitted light beams can be expanded, and thereby the light beams can be irradiated to the driver's eyeball positions regardless of the frame and posture of the driver.

The vehicle display device may include a display panel which represents an image by using differences in light transmittance and a projection light source which projects the image on the display panel onto the first major surface of the light guide plate whereby information can be displayed not only on the emission end plane but the first major surface on the driver's side of the light guide plate. Therefore, it is not required to provide a separate display space, thus enabling a wide variety of information to be provided for the driver.

DETAILED DESCRIPTION OF THE INVENTION

Figure 1:
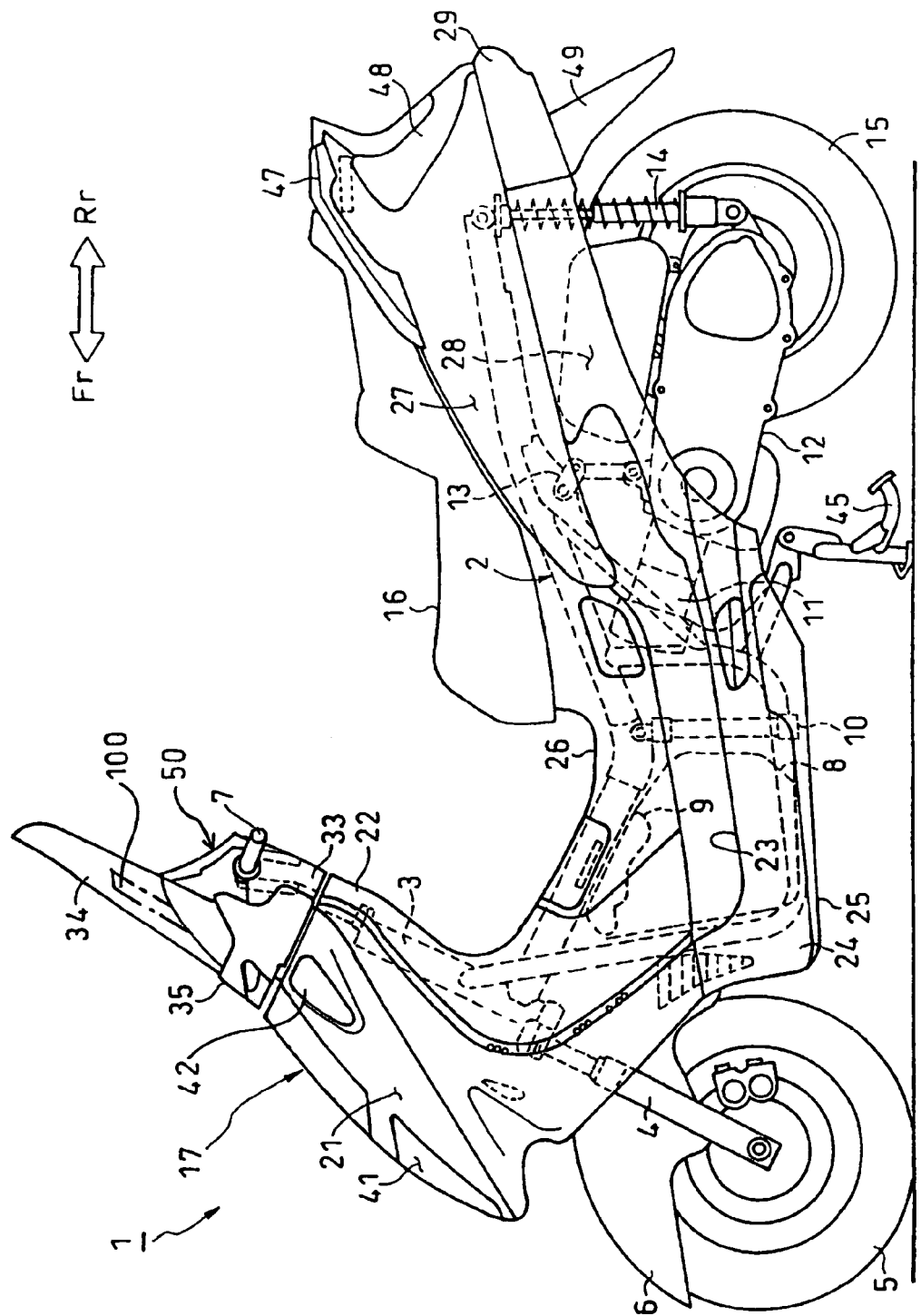
FIG. 1 is a side view of a scooter on which a vehicle display device of the present invention is mounted.
Figure 2:
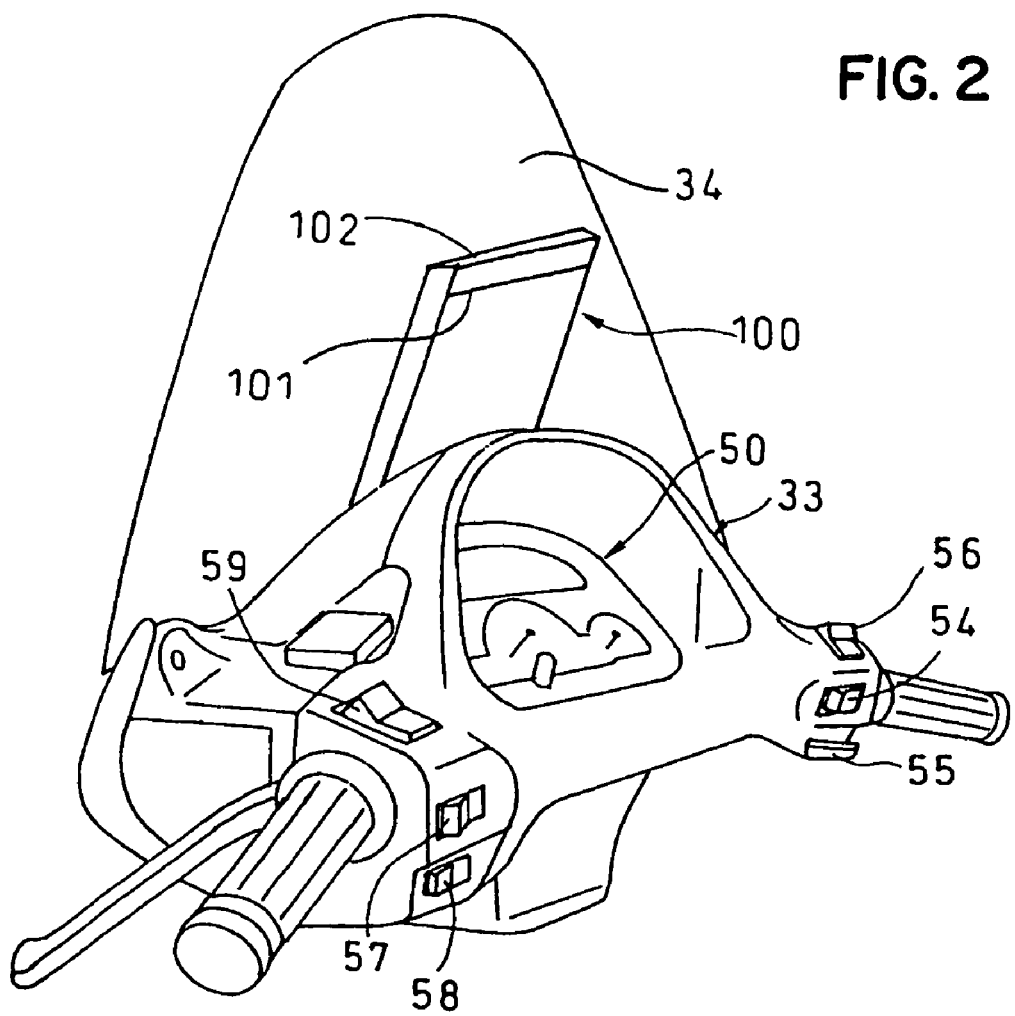
FIG. 2 is a view of a vehicle instrument panel of FIG. 1 viewed from the rear of one side of the scooter.
Figure 3:
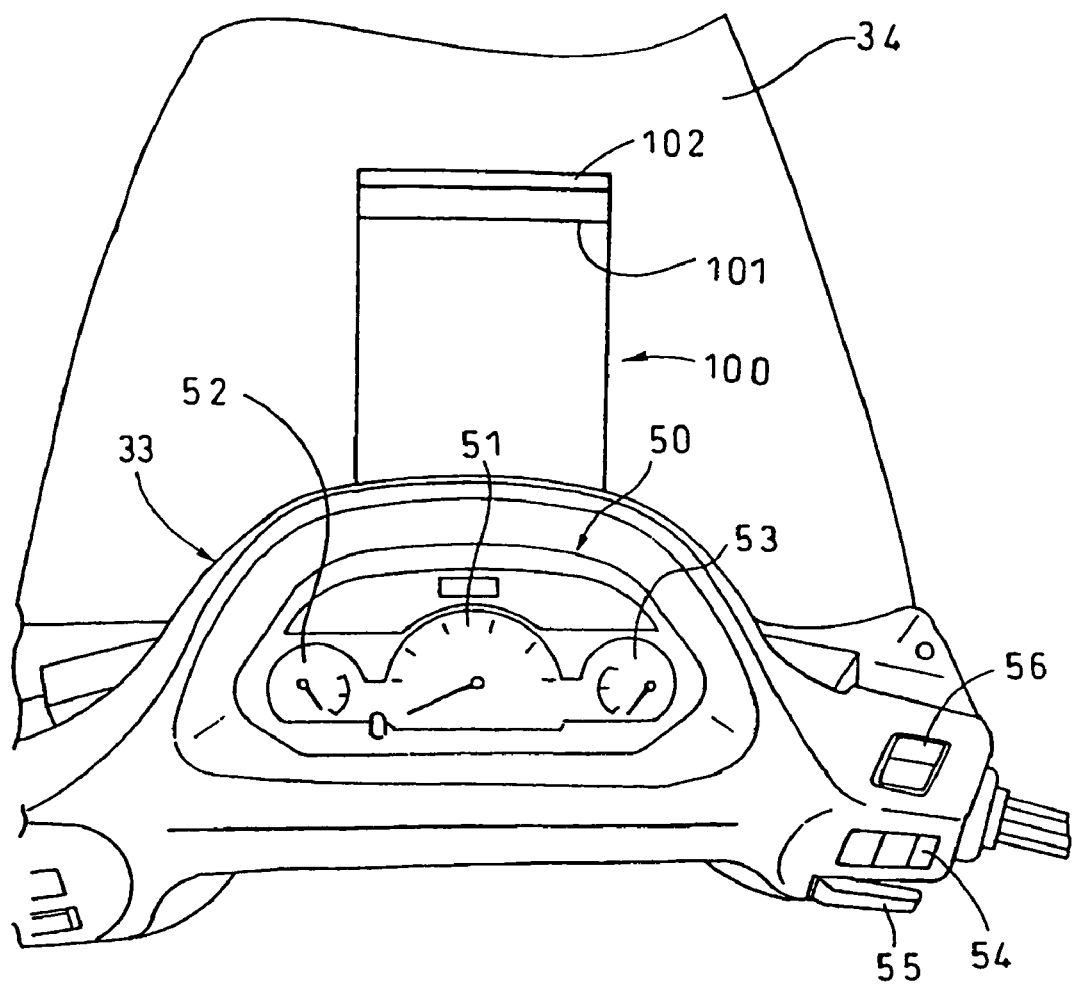
FIG. 3 is a view of the vehicle instrument panel of FIG. 1 viewed from positions of the driver's eyeballs.

Hereinafter, preferred embodiments of the present invention will be described in detail with reference to the drawings. FIG. 1 is a side view of a motorcycle on which a vehicle display device of the present invention is mounted. FIG. 2 is a view of an instrument panel of the motorcycle viewed from the rear in an oblique direction. FIG. 3 is a view of the instrument panel viewed from positions of the driver's eyeballs. In FIGS. 2 and 3, depiction of a windshield 34 shown in FIG. 1 is omitted.

A scooter type motorcycle (hereinafter, referred to as "scooter") 1 has a body frame 2 extending from a front to a rear direction of the body. A head pipe 3 is attached to a front end of the body frame 2, and a front wheel 5 is attached to an end of a front fork 4 extending downward from the head pipe 3. The top of the front wheel 5 is covered by a front fender 6.

To the top of the front fork 4, a handle 7 is fixed. The center of the handle 7 is covered by a handle cover 33. A transparent windshield 34 is provided to the handle cover 33 through an un-illustrated stay, and a screen garnish 35 is provided as a covering member at the front bottom of the windshield 34.

Within a cradle space surrounded by each pipe of the body frame 2, a fuel tank 8, a reservoir tank for a radiator 9 and a radiator 10 are provided. At the rear of the cradle space, a power unit 12 having a water-cooled engine 11 on the front thereof is provided. The power unit 12 is swingably attached to the body frame 2 while the front and rear ends thereof are suspended by a link mechanism 13 and a rear cushion 14, respectively. A rear wheel 15 is attached to the rear of the power unit 12, and the body frame 2 is covered by a body cover 17. A seat 16 is placed on the rear top of the body frame 2.

The front of the body cover 17 is formed by a front cover 21 and an inner cover 22. The front cover 21 covers the front of the head pipe 3 and the top of the front wheel 5, and the inner cover 22 covers the rear of the front cover 21. Right and left step floors 23, where the driver put his/her feet, extend rearward from the inner cover 22. Floor skirts 24 extend downward from outer edges of the step floors 23.

A space between bottom edges of the floor skirts 24 is covered by an under cover 25, and the longitudinal center of the body frame 2 is covered by a center cover 26 extending rearward from the inner cover 22. Both sides of the rear of the body frame 2 are covered by side covers 27 extending rearward from the center cover 26. Right and left lower side covers 28 extend downward from outer edges of the side covers 27. The bottom of the rear end of the body frame 2 is covered by a rear center cover 29 provided at the rear of the lower side covers 28.

Head lamps 41 and winker lights 42 are attached to the front cover 21. In addition, an unillustrated antenna for ASV is placed within the front cover 21. A main stand 45 is provided at the bottom of the body. At the rear of the body, a rear grip 47, a tail lamp 48 and rear fender 49 are provided.

An instrument panel (meter panel) 50 is built in the handle cover 33. At the center of the panel board of the instrument panel 50, a speedometer 51 is provided, and a fuel gauge 52 and a water temperature gauge 53 are provided on the left and right sides thereof, respectively. A hazard switch 54, a start switch 55 and a kill switch 56 are respectively provided on the upper front face side, lower front face side and top surface adjacent to the instrument panel 50 on the right side thereof. In addition, a winker switch 57, a horn switch 58 and high beam/low beam switch 59 are respectively provided on the upper front face side, lower front face side and top surface adjacent to the instrument panel 50 on the left side thereof.

A light guide plate 100 which constructs the vehicle display device of the present invention is stood and supported between the instrument panel 50 and the windshield 34 in the front of the driver's sight. At the same time, the light guide plate 100 is tilted rearward (toward the driver) by a predetermined angle. The light guide plate 100 guides light, which is irradiated from luminous elements (not shown) such as LEDs provided on the entrance end plane thereof at the bottom, to the emission end plane 102 thereof at the top and emits the light outside.

Figure 4:
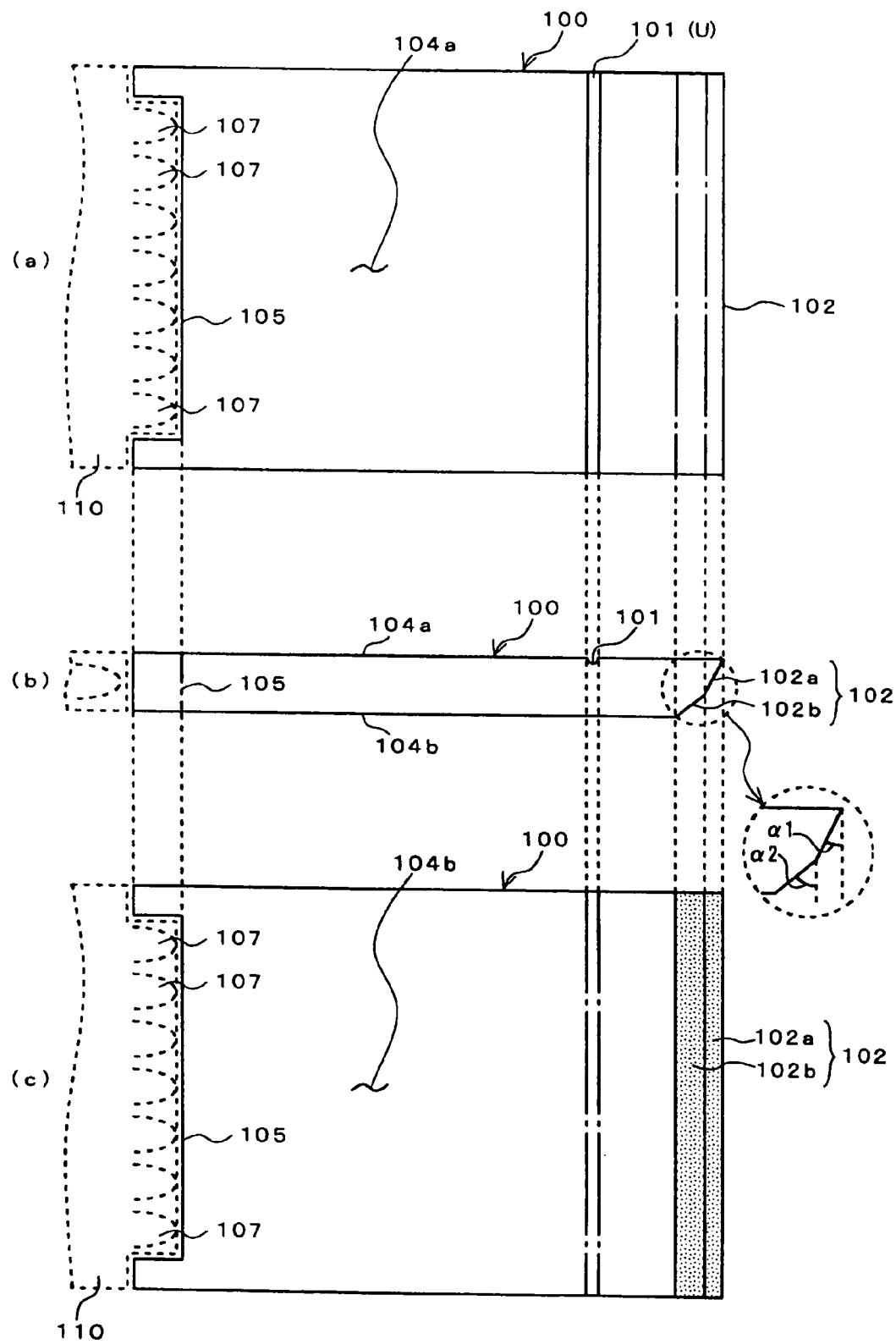
FIGS. 4(a) to 4(c) are plan views of both first and second major surfaces and a side surface of a light guide plate.

FIGS. 4(*a*) to 4(*c*) are plan views of a first embodiment of the light guide plate 100. The FIG. 4(*a*) is a plan view of a first major surface (104*a*) facing the driver, FIG. 4(*b*) is a side view thereof, and FIG. 4(*c*) is a plan view of a second major surface (104*b*). The same reference numerals as those mentioned earlier designate the same or equal constituents.

The light guide plate 100 is a plate body made of resin such as transparent acryl and polycarbonate, through which the other side can be seen from the first major surface 104*a* thereof. An entrance end plane 105 at one end thereof includes concave portions where a luminous element unit 110 having a plurality of linearly arranged LEDs 107 is attached. The light that enters from the entrance end plane 105 into the light guide plate 100 is transmitted to an emission end plane 102 at the other end. This light is refracted by a predetermined angle at the emission end plane 102 and then emitted outside.

Here, in this embodiment, a distance from the entrance end plane 105 to the emission end plane 102 of the light guide plate 100 is sufficiently long with reference to a distance between the first and second major surfaces (plate thickness). Accordingly, among the light beams incident from the LEDs 107, not only direct light beams but also light beams which are reflected plurality of times within the light guide plate 100 in a plate-width direction can be emitted from the emission end plane 102. As a result, an irradiation area of the emitted light beams is expanded.

With this type of construction, the light irradiated from the luminous elements such as LEDs 107 is guided to the emission end plane 102 and emitted by the light guide plate 100. Therefore, the emitted light can be irradiated to the position of the driver's eyeballs only by adjusting the installation angle of the light guide plate 100 and the inclination angle of the emission end plane 102. Further, the light guide plate 100 is a transparent body through which the other side can be seen from the first major surface thereof. Therefore, the sight ahead of the driver is not obstructed by the light guide plate 100.

Note that the emission end plane 102 of the light guide plate 100 may be a single inclined plane. However, with the single inclined plane, the emitted light from the emission end plane 102 may not be visually identifiable depending on the intensity of the reflected sunlight, when positions of the sun, the emission end plane 102 and driver's eyeballs are relative to each other in a manner that the reflected sunlight from the emission end plane 102 enters the driver's eyeballs.

As particularly shown in FIG. 4(*b*), this technological problem can be resolved in the following manner; the emission end plane 102 includes two inclined end planes 102*a* and 102*b* which are inclined by predetermined angles α1 and α2 (35 degrees and 40 degrees in this embodiment), respectively, with reference to a vertical end plane. With this manner, even when the sunlight is intensively reflected off one of the inclined end planes, the reflected sunlight off the other end plane is weak. Hence, the emitted light from the light guide plate 100 is visually identifiable on the other inclined end plane. Consequently, it is possible to prevent poor visibility where the transmitted light from the light source cannot be recognized due to reflected sunlight.

Furthermore, as described above, when the emission end plane 102 includes a plurality of the inclined end planes 102*a* and 102*b*, the emission direction of the light from the emission end plane 102 is dispersed and thus the irradiation area expands. Therefore, the light can be irradiated to the position of the driver's eyeballs regardless of the frame and posture of the driver.

Alternatively, instead of providing the plurality of inclined end planes 102*a* and 102*b* with different inclination angles in the emission end plane 102 as described above, a U-shaped groove 101(U) may be formed, or together with the inclined end planes. As shown in FIG. 4(*a*), this U-shaped groove 101(U) may be formed in the face of the first major surface 104*a* of the light guide plate 100 adjacent to the emission end plane so as to be perpendicular to a light guide direction. With this type of construction, a part of the light transmitted from the light guide plate 100 is emitted outside from the groove 101 (U) and enters the driver's eyeballs. Therefore, states of the luminous elements can be identified based on presence of the light emitted from the groove 101 (U) even in the case where the emitted light from the emission end plane 102 is difficult to be recognized due to the reflected sunlight.

Furthermore, in this embodiment, particularly as shown in FIG. 4(*c*), frosting for light scattering is performed on the emission end plane 102 to scatter the emitted light, further expanding the irradiation area of the light. Consequently, the light can be irradiated to the position of the driver's eyeballs regardless of the frame and posture of the driver.

Figure 5:
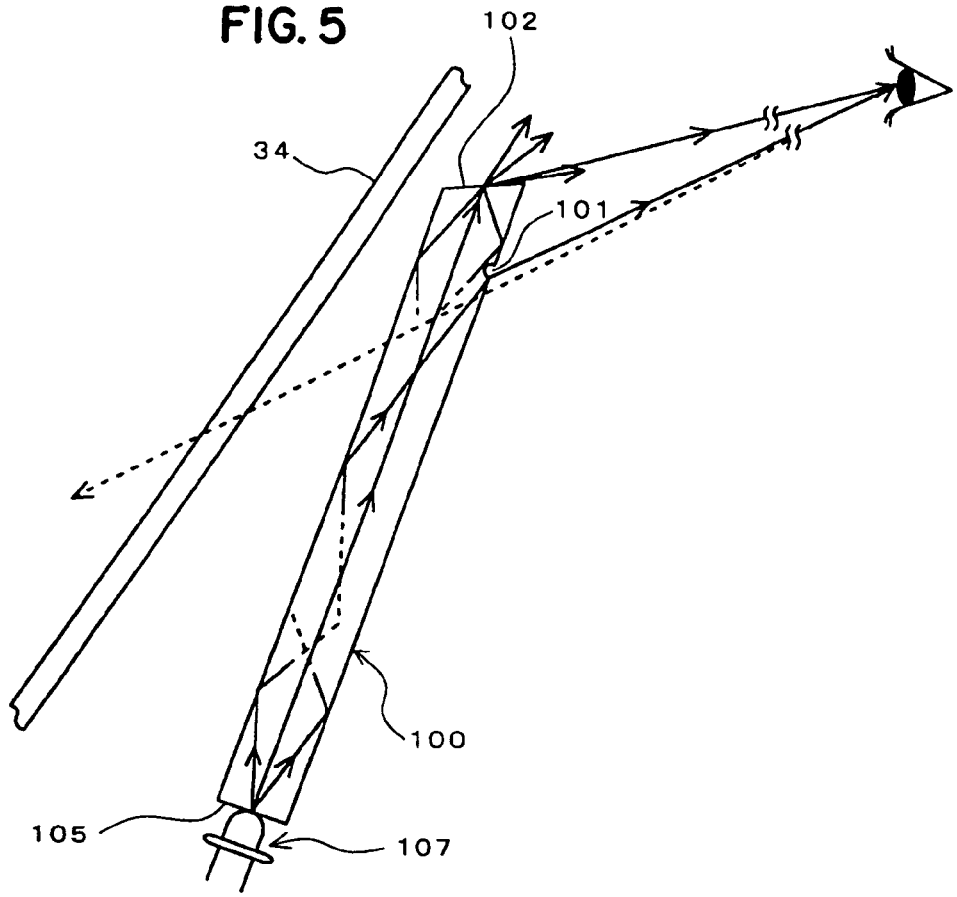
FIG. 5 is a view showing how light is transmitted and emitted by the light guide plate.

FIG. 5 is a side view specifically showing how the light is transmitted and emitted by the foregoing light guide plate 100. The light irradiated from the LEDs 107 enters from the entrance end plane 105 of the light guide plate 100. The light is then transmitted directly to the emission end plane 102 or transmitted thereto while being reflected. The light that has reached the emission end plane 102 is refracted by a predetermined angle at the surface thereof before being emitted outside, and then enters the driver's eyeballs. In addition, a part of the transmitted light is emitted outside from the U-shaped groove 101(U) and then enters the driver's eyeballs. Accordingly, once the LEDs 107 illuminate, the driver can visually identify the visible light irradiated from the LEDs 107 at two positions, i.e., the emission end plane 102 and the U-shaped groove 101(U) of the light guide plate 100.

Moreover, the light guide plate 100 is constructed by a transparent acryl plate so that the front can be seen therethrough from the first major surface 104*a* on the driver's side. Therefore, the driver can view the front through the light guide plate 100 and the windshield 34. Hence, the sight ahead of the driver is not obstructed by the presence of the light guide plate 100.

Figure 6:
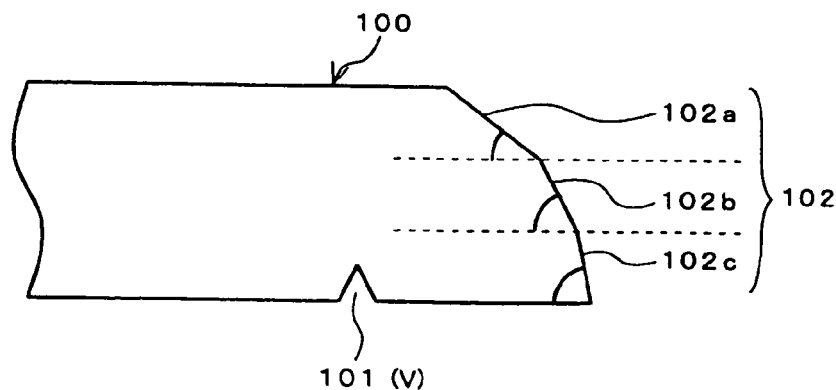
FIG. 6 is an enlarged partial view showing a construction of another embodiment of the light guide plate.

FIG. 6 is an enlarged side view of the vicinity of the emission end plane of the light guide plate 100 which is a second embodiment of the present invention. In the aforementioned embodiment, the end plane 102 was described as including two planes having different inclination angles.

However, the present invention is not limited to this and may be constructed by three or more planes 102a, 102b, 102c . . . having different inclination angles.

Furthermore, the groove 101(U) was described as a U-shaped groove in the first embodiment. However, this groove may be a V-shaped groove 101(V) as shown in FIG. 6 as long as it enables part of the transmitted light to be irradiated outside and to be entered into the eyes of the driver.

Figure 7:
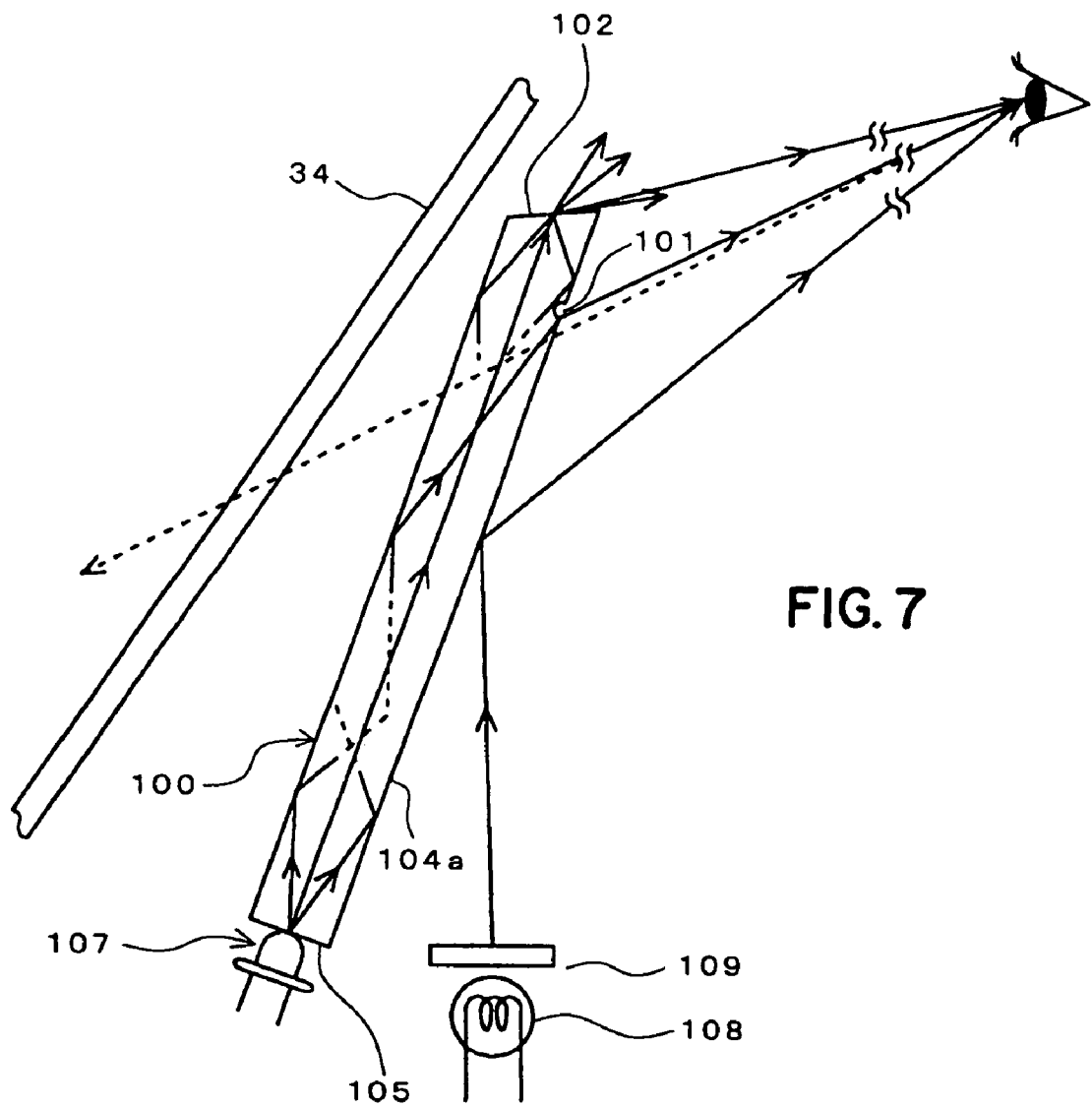
FIG. 7 is a side view of an embodiment which utilizes the first major surface of the light guide plate as a reflection surface.

FIG. 7 is a view showing a construction of a major part of another embodiment of the vehicle display device according to the present invention. The same reference numerals as those described earlier designate the same or equal constituents.

A display panel 109 is either a light-transmissive liquid crystal panel which represents a dynamically changing image by utilizing differences in (high and low levels of) light transmittance, or a screen where a predetermined stationary image is represented. In this embodiment, visible light irradiated from a projection light source 108 is partially shielded and reduced by the display panel 109, and thus the light is patterned. Thereafter, the patterned light is reflected off the first major surface 104a on the driver's side of the light guide plate 100. Thus, the driver can visually identify the patterned light.

According to this embodiment, information can be displayed not only on the end plane 102 of the light guide plate 100 but also on the first major surface 104a thereof on the driver's side. Therefore, a wide variety of information can be provided for the driver without providing a separate display space.

While the invention has been described in particular embodiments, it is to be understood that the words which have been used are words of description rather than limitation and that changes within the purview of the appended claims may be made without departing from the true scope and spirit of the invention in its broader aspects.

We claim:

1. A vehicle display device which is mounted on a vehicle and displays vehicle information using light emission, comprising:
    a transparent light guide plate having a first major surface and a second major surface, and through which another side can be seen from the first major surface, said light guide plate being in such a position that the first major surface thereof faces a driver in front of a sight line of the driver and that the light guide plate tilts rearward toward the driver while a light entrance end plane thereof is oriented at the bottom and a light emission end plane thereof is oriented at the top; and
    at least one luminous element disposed at the entrance end plane of the light guide plate.

2. The vehicle display device according to claim 1, wherein the emission end plane of the light guide plate includes a plurality of planes having different inclination angles with reference to front and rear directions.

3. The vehicle display device according to claim 1 wherein the emission end plane of the light guide plate is frosted.

4. The vehicle display device according to claim 1 wherein a groove is formed in the first major surface of the light guide plate in a width direction of the light guide plate and perpendicular to a light guide direction.

5. The vehicle display device according to claim 1 wherein a distance from the entrance end plane to the emission end plane of the light guide plate is sufficiently long with reference to a distance between the first and second major surfaces thereof wherein a direct light beam and a light beam reflected a plurality of times within the light guide plate in a plate width direction are emitted from the emission end plane.

6. The vehicle display device according to claim 1 comprising:
    a display panel which represents an image by utilizing differences in light transmittance; and
    a projection light source which projects the image on the display panel onto the first major surface of the light guide plate.

7. The vehicle display device of claim 6 wherein the display panel comprises a liquid crystal panel that represents a dynamically changing image.

8. The vehicle display device of claim 6 wherein the display panel comprises a screen wherein a predetermined stationary image is represented.

9. A light guide plate of a vehicle display device, comprising a first major surface facing generally toward an intended viewer, a second major surface opposite the first major surface, an entrance end plane through which light enters, and an emission end plane that emits the light, wherein the emission end plane of the light guide plate includes a plurality of planes having different inclination angles.

10. A light guide plate of a vehicle display device, comprising a first major surface, a second major surface opposite the first major surface, an entrance end plane through which light enters, and an emission end plane that emits the light, wherein an emission end plane is frosted.

11. A light guide plate of a vehicle display device, comprising a first major surface facing generally toward an intended viewer, a second major surface opposite the first major surface, an entrance end plane through which light enters, and an emission end plane that emits the light, wherein a groove is formed in the first major surface of the light guide plate in a width direction of the light guide plate and perpendicular to a light guide direction.

12. The light guide plate of the vehicle display device according to claim 9 wherein a distance from the entrance end plane to the emission end plane of the light guide plate is sufficiently long with reference to a distance between the first and second major surfaces thereof wherein a direct light beam and a light beam reflected a plurality of times within the light guide plate in a plate width direction arc emitted from the emission end plane.

* * * * *